United States Patent
Baricco et al.

(10) Patent No.: US 7,318,943 B2
(45) Date of Patent: Jan. 15, 2008

(54) FEED SUPPLEMENT FOR INCREASING THE PLASMA AMINO ACID LEVEL OF RUMINANT LIVESTOCK AND METHOD OF ADMINISTRATION

(75) Inventors: Giuseppe Baricco, Turin (IT); Manfred Peisker, Idstein (DE)

(73) Assignee: Archer-Daniels-Midland Company, Decatur, IL (US)

( * ) Notice: Subject to any disclaimer, the term of this patent is extended or adjusted under 35 U.S.C. 154(b) by 527 days.

(21) Appl. No.: 10/373,182

(22) Filed: Feb. 26, 2003

(65) Prior Publication Data

US 2003/0165591 A1   Sep. 4, 2003

Related U.S. Application Data

(60) Provisional application No. 60/359,691, filed on Feb. 27, 2002.

(51) Int. Cl.
  *A23J 1/00*  (2006.01)
(52) U.S. Cl. .......................... 426/656; 426/2; 426/615; 426/635
(58) Field of Classification Search .................... 426/2, 426/72, 74, 615, 635, 656
  See application file for complete search history.

(56) References Cited

U.S. PATENT DOCUMENTS

| | | | |
|---|---|---|---|
| 4,181,709 A | 1/1980 | Dannelly |
| 4,777,051 A | 10/1988 | Nagano et al. |
| 4,789,686 A | 12/1988 | Giraud |
| 4,919,945 A | 4/1990 | Spindler et al. |
| 5,133,976 A | 7/1992 | Rouy |
| 5,622,710 A | 4/1997 | Binder et al. |
| 6,017,563 A | 1/2000 | Knight et al. |
| 6,183,786 B1 | 2/2001 | Knight et al. |
| 6,238,714 B1 | 5/2001 | Binder et al. |
| 6,340,486 B1 | 1/2002 | Binder et al. |

FOREIGN PATENT DOCUMENTS

| | | |
|---|---|---|
| EP | 0 122 163 B2 | 10/1984 |
| EP | 0 253 740 B1 | 1/1988 |
| EP | 0 491 638 A2 | 6/1992 |
| EP | 0 533 039 B1 | 3/1993 |
| EP | 0 534 865 A1 | 3/1993 |
| EP | 0 615 693 B1 | 9/1994 |
| EP | 0 826 662 A1 | 3/1998 |
| EP | 1 005 788 A1 | 6/2000 |
| EP | 1 062 877 A1 | 12/2000 |
| EP | 1 118 673 A1 | 7/2001 |
| FR | 2 709 120 | 2/1995 |
| WO | WO 85/02323 A1 | 6/1985 |
| WO | WO 93/10667 A1 | 6/1993 |

OTHER PUBLICATIONS

Dialog File 351, Accession No. 4106559, Derwent English language abstract of EP 0 122 163 B2 (Document AL1), no date.
Dialog File 351, Accession No. 9401517, Derwent English language abstract of EP 0 533 039 B1 (Document AN1), no date.
Dialog File 351, Accession No. 10019233, Derwent English language abstract of EP 0 615 693 B1 (Document AO1), no date.
International Search Report for International Patent Application No. PCT/IB01/01384, mailed Nov. 2, 2001.
Dialog File 351, Accession No. 1988-016059/198803, Derwent English language abstract of EP 0 253 740 B1 (Document AL2), no date.
Dialog File 351, Accession No. 1995-100552/199514, Derwent English language abstract of FR 2 709 120 (Document AN2), no date.
Murphy, M.R., et al., "Factors Affecting Water Consumption by Holstein Cows in Early Lactation," *J. Dairy Sci.* 66:35-38, American Diary Science Association (1983).
Co-Pending U.S. Appl. No. 09/922,939, Peisker et al., filed Aug. 7, 2001 (Not Published).
International Search Report for International Patent Application No. PCT/IB03/00725, mailed Jul. 1, 2003.
Dialog File 351, Accession No. 9409573, Derwent English Abstract of EP 0 534 865 A1 (Document AP2), no date.
Dialog File 351, Accession No. 13676823, Derwent English Abstract of EP 1 062 877 A1 (Document AM3), no date.

*Primary Examiner*—Leslie Wong
(74) *Attorney, Agent, or Firm*—Buchanan Ingersoll & Rooney PC; Bryan H. Opalko; Craig G. Cochenour

(57) ABSTRACT

A feed supplement for increasing the plasma amino acid level of animals, including animal feed and liquid lysine base, where the liquid lysine base has a concentration between about 45% and about 55%, and has a pH level of between about 9.5 and about 10.5, a chloride content between about 0.10% and about 0.15%, a bulk density of between about 1.14 and about 1.17 $g/cm^3$, and a maximum moisture level of between about 42% and about 48%. The animal feed may either be dry feed, liquid feed, drinking water or milk replacers, or a combination thereof. The present invention also includes a method of increasing the plasma amino acid level of animals, including the steps of providing animal feed, and supplementing the animal feed with an amino acid supplement comprising liquid lysine base having a concentration between about 45% and about 55%, and having a pH level of between about 9.5 and about 10.5.

34 Claims, No Drawings

FEED SUPPLEMENT FOR INCREASING THE PLASMA AMINO ACID LEVEL OF RUMINANT LIVESTOCK AND METHOD OF ADMINISTRATION

CROSS-REFERENCE TO RELATED APPLICATIONS

This application claims the benefit of U.S. Provisional Application No. 60/359,691, filed Feb. 27, 2002.

BACKGROUND OF THE INVENTION

1. Field of the Invention

This invention relates to a feed supplement and method of administration for increasing the plasma amino acid level of ruminant livestock.

2. Background Art

Amino acids, the basic components of proteins, have long represented the most economical and efficient means for adapting the protein composition of the diets of animals bred for productive purposes to the increasing needs dictated by genetic improvement and the qualitative demands of the market for products of animal origin. Consequently, amino acids, particularly lysine and methionine, are commonly provided to animals in variable amounts according to the amino acid composition of the base feed and of the required nutritional objectives.

Amino acids of industrial origin come from chemical synthesis or fermentation processes, and are available to the animal feed industry either in powder or liquid form, chemically formulated either as natural-like amino acids or as various chemical derivatives, which are then metabolized by the animal in biologically active amino acids.

Typical amino acids include alanine, beta-alanine, arginine, asparagine, aspartic acid, carnitine, citrulline, cysteine, cystine, gamma-aminobutryic acid, glutamic acid, glutathione, glycine, histidine, hydroxyproline, isoleucine, leucine, lysine, methionine, ornithine, phenylalanine, proline, serine, taurine, threonine, tryptophan, tyrosine and valine.

It is known to supplement the feed of ruminant animals with commercial amino acid compositions, for example SMARTAMINE® and RHODIMET® AT 88, available from Rhone Poulenc Animal Nutrition, Atlanta, Ga., and LysMet available from SILO S.r.1., Firenze, Italy. Such amino acid compositions may be administered either through spraying onto dry feed, or in liquid form through drinking water, milk replacers or liquid feed.

The ruminant species (especially bovines, and to a lesser degree sheep, goats and buffalo) have difficulty benefitting from the addition of amino acids to their diet, which they need from a nutritional point of view, because the rumen, acting as a biological fermentor, transforms the amino acids added to the fodder, using them as components in culture material for the bacterial and protozoan populations which are its natural inhabitants.

Previous commercial amino acid compositions have not been able to adequately increase the plasma amino acid level in ruminant animals. In particular, the amino acid concentration, pH level, chloride content, bulk density, and maximum moisture of known commercial amino acid compositions contribute to the undesirable properties of an increased fermentation capability and a slow absorption through the walls of a rumen.

Thus, there is a need for a feed supplement and method of administration for increasing the plasma amino acid level of ruminant livestock.

BRIEF SUMMARY OF THE INVENTION

One aspect of the present invention is drawn to a feed supplement for increasing the plasma amino acid level of animals, including animal feed and a liquid lysine base having a concentration of between about 45% and about 55%, and having a pH level of between about 9.5 and about 10.5, a chloride content between about 0.10% and about 0.15%, a bulk density of between about 1.14 and about 1.17 g/cm$^3$, and a maximum moisture level of between about 42% and about 48%. The animal feed may either be dry feed or a liquid such as liquid feed, drinking water or milk replacers, or a combination thereof.

The present invention also includes a method of increasing the plasma amino acid level of animals, including the steps of providing animal feed, and supplementing the animal feed with an amino acid supplement comprising liquid lysine base having a concentration between about 45% and about 55%, and having a pH level of between about 9.5 and about 10.5.

Supplementing the diet of ruminants, especially bovines, with high levels of amino acids, particularly lysine, allows specific productive results to be obtained. For example, supplementation in dairy cattle or brood cows increases both the liters of milk produced per day and the protein content in the milk produced. This also improves the overall health of the animals as a result of a better balanced feeding by producing a reduction in ketosis, lowering of somatic cells, providing better immune status, and more efficient reproductive performances. Supplementing the diet of buffalo, sheep and/or goats with high levels of amino acids produces the same advantages as stated above for bovines.

Supplementation in beef cattle increases production quantitatively, measured by grams of increased weight per day, and by improving the quality of the carcass through the percentage of total lean cuts and the corporal development of the commercially valuable parts. This also improves the health condition of the beef cattle as a result of a better balanced feeding, resulting in a better health response in the phase and lower incidence of disease during the breeding cycle.

DETAILED DESCRIPTION OF THE INVENTION

A preferred embodiment of the present invention is now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

One aspect of the present invention is drawn to a feed supplement for increasing the plasma amino acid level of animals, including animal feed and an amino acid. The animal feed may either be dry feed or a liquid such as liquid feed, drinking water or milk replacers, or a combination thereof.

In a preferred embodiment, the amino acid is lysine, preferably in liquid form. In a preferred embodiment, the amino acid is liquid lysine base having a concentration of between about 45% and about 55%. In a most preferred embodiment, the amino acid is liquid lysine base having a concentration of about 50%.

Preferably, the liquid lysine base has a pH level of between about 9.5 and about 10.5. In a more preferred embodiment, the liquid lysine base has a pH level of between about 9.8 and about 10.2. In a most preferred embodiment, the liquid lysine base has a pH level of about 10.

Preferably, the liquid lysine base has a chloride content below about 0.25%. In a more preferred embodiment, the liquid lysine base has a chloride content between about 0.10% and about 0.15%. In a most preferred embodiment, the liquid lysine base has a chloride content of about 0.10%.

Preferably, the liquid lysine base has a bulk density of between about 1.10 and about 1.25 g/cm$^3$ In a more preferred embodiment, the liquid lysine base has a bulk density of between about 1.14 and about 1.17 g/cm$^3$ In a most preferred embodiment, the liquid lysine base has a bulk density of about 1.17 g/cm$^3$.

Preferably, the liquid lysine base has a maximum moisture level of between about 42% and about 48%. In a most preferred embodiment, the liquid lysine base has a maximum moisture level of about 45%.

In a preferred embodiment, the liquid lysine base is ADM 50% Liquid L-Lysine (available from Archer-Daniels-Midland Company, Decatur, Ill.), which is an aqueous solution of L-Lysine free base obtained by concentrating lysine from fermentation broth. Typical properties for ADM 50% Liquid L-Lysine are listed in the table below:

| Chemical Specifications: | |
|---|---|
| Chemical Formula | $C_6H_{12}N_2O_2$ |
| Molecular Weight | 146.20 |
| Characteristics: | |
| Appearance | Dark Brown Liquid |
| Lysine content | 50.0% |
| Isomeric purity | 100.0% L |
| Bulk density at 77° F. (25° C.) | 1.14–1.17 g/cm$^3$ (9.6–9.8 lbs/gal) |
| pH | 9.5–10.5 |
| Minimum shelf life | 1 year stored at 20° C. |
| Maximum moisture | 42.0%–48.0% |
| Chloride content | 0.10%–0.15% |
| Nutritional Specifications on a dry weight basis: | |
| Minimum L-Lysine base | 50.0% |
| Dry matter | 52.0%–58.0% |
| Crude protein | 61.5% |
| Nitrogen | 10.0% |
| Fat | <0.01% |
| Carbohydrate | <0.02% |
| Additional Amino Acid Content | |
| Valine | 0.57% |
| Threonine | 0.01% |
| Alanine | 0.18% |
| Glycine | 0.09% |
| Leucine | 0.09% |
| Total | <2.0% |
| Mineral Content | |
| calcium | <0.01% |
| phosphorus | 0.01% |
| potassium | 0.10% |
| sodium | 0.01% |
| chloride | 0.10% |
| sulfur | 0.22% |

| Metabolizable Energy | kcal/lb | kcal/kg | MJ/kg |
|---|---|---|---|
| Poultry | 1182 | 2600 | 10.87 |
| Swine | 1266 | 2786 | 11.65 |

Another aspect of the present invention is a method of increasing the plasma amino acid level of animals, including the steps of providing animal feed, and supplementing the animal feed with an amino acid. In a preferred embodiment, the amino acid is liquid lysine base having a concentration of about 50%, and having a pH level of between about 9.5 and about 10.5, a chloride content between about 0.10% and about 0.15%, a bulk density of between about 1.14 g/cm$^3$ and about 1.17 g/cm$^3$, and a maximum moisture level of between about 42% and about 48%, as described above.

The animal feed may be a dry feed, a liquid, or a combination thereof. In one embodiment, liquid lysine base is added to a dry feed such as mixed fodder through spraying. In a preferred embodiment, the animal feed may be a liquid such as drinking water, milk replacers, or liquid feed. In an alternate embodiment, liquid lysine base may be added to a combination of dry feed and a liquid feed, such as a combination of mixed fodder and milk replacers.

In a preferred embodiment, liquid amino acid is administered to ruminant livestock by diluting the liquid lysine base in a liquid such as drinking water, milk replacers, or liquid feed. The dilution occurs immediately, since it is a matter of hydrosoluble products, and the relatively low percentage of inclusion in the drinking water or other liquid necessary for obtaining useful dosages prevents potential chemical incompatibility problems and does not affect the palatability of the liquid itself. The percentage of inclusion of the lysine in the liquid may be from about 0.1% to about 0.3%.

A system for administering the lysine may include a fluid supply line used in livestock and a one one-way valve connected to the line. The valve prevents the return of amino acids from the fluid distribution system. A measurement device such as a flowmeter or liter-counter may be connected to the line downstream from the one-way valve. The system may also includes a pump for injecting the lysine into the fluid system, and is equipped with a gradient for regulating the projected flow for the livestock, activated by the measurement device. Every time the liquid from the system passes through after it is activated by the animals using drinking troughs, it injects a known and anticipated amount of lysine in the liquid pipeline. The lysine may be contained in vats and drawn up by appropriate devices and introduced into the flow of liquid towards the drinking troughs.

A method for supplying liquid products to ruminant livestock is simple and efficient. The method first involves calculating the daily consumption of liquid by the animals. This calculation may be performed by means of known nutritional formulas (Murphy M R et al., "Factors Affecting Water Consumption by Holstein Cows in Early Lactation," *J. Dairy Science,* 66:35(1983)) or, when present, by verifying the data offered by a measurement device such as a liter-counter found in the equipment. In a preferred embodiment, drinking water may be supplied from about 30 liters/day/head to about 150 liters/day/head. In a more preferred embodiment, drinking water may be supplied from about 50 liters/day/head to about 80 liters/day/head. In a most preferred embodiment, drinking water may be supplied from about 70 liters/day/head to about 80 liters/day/head.

Then, the amount of amino acids whose administration to the animals is desired is calculated based on bioavailability data. In a preferred embodiment, the amount of amino acid to be supplied to each animal may be from about 10 grams to about 500 grams. In a more preferred embodiment, the amount of amino acid to be supplied to each animal may be from about 100 grams to about 300 grams. In a most preferred embodiment, the amount of amino acid to be supplied to each animal may be about 200 grams.

Next, the percentage of inclusion of each amino acid per liter of liquid is calculated, based on the amino acid concentration found in the commercial product whose use is intended. In a preferred embodiment, the percentage of inclusion of each amino acid per liter of liquid is between about 0.01% to about 10.0%. In a more preferred embodiment, the percentage of inclusion of the amino acid in the liquid may be from about 0.05% to about 0.5%. In a most preferred embodiment, the percentage of inclusion of the amino acid in the liquid may be from about 0.1% to about 0.3%. Finally, the system is titered by means of gradients installed on every individual pump. An example of this method is provided in Example 1.

While the invention has been particularly shown and described with reference to preferred embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

EXAMPLE 1

The following is an example of a calculation for supplying the proper amount of liquid lysine base product to ruminant livestock. This calculation can be easily executed by special, simple computerized support, which may be furnished as a complement to the system of the invention.
Mean amino acid bioavailability: 20%
Mean bovine water consumption: 62.5 L/head/day
Nutritional lysine requirements: 20 g/head/day
Nutritional methionine requirements: 7 g/head/day
Commercial liquid lysine base: 50% amino acid titer

|  | Lysine |
| --- | --- |
| Liters of $H_2O$ consumed/cow/day | 62.5 |
| Bioavailable amino acid requirement | 20 grams |
| Grams to be supplied based on 20% bioavailability (k = 5) | 100 g |
| Grams to be supplied based on commercial product concentration (x) | 200 g (50%) |
| Grams of amino acid required per liter of water (x: 62.5) | 3.2 |
| Percentage to be titered on the equipment mark | 0.32% |

EXAMPLE 2

Plasma amino acid levels were monitored in non-lactating Holstein cows given a single oral dose of the tested treatments for a total amount of 60 g of lysine and 50 g of methionine. Two non-lactating dairy cows kept in a fixed stall and fed at maintenance level (Table 2) were used. Animals were given a one day bolus of the product, either in solution or mixed to mild water, through the esophagus. Then, animals were given 30% of their daily diet, and the remainder was given at the end of the first feed consumption. The trial was carried out twice, as shown in Table 1.

The following products were used:
SMARTAMINE M: rumen protected amino acid with a pH dependent co-polymer (vinil-2-piridin-stirene) (available from Rhone Poulenc Animal Nutrition, Atlanta, Ga.)
75% Methionine
SMARTAMINE ML: rumen protected amino acid with a pH dependent co-polymer (vinil-2-piridin-stirene) (available from Rhone Poulenc Animal Nutrition, Atlanta, Ga.)
39% Lysine +15% Methionine
Bioavailability: 90%
Protection: 90% into water solution, pH 6, 40° C., 24 hours.
RHODIMET AT 88 (Rhone Poulenc): liquid methionine hydroxy analogue (pH: 1)
DL-2-idroxy-4-methyltiobutanoic acid
[$CH_3$—S—$CH_2$—$CH_2$—CH(OH)—COOH]
Methionine hydroxy analogue: 88%
SILO LysMet calcium soap: rumen protected lysine and methionine (available from SILO S.r.l. Firenze, Italy).
Lysine: 24%, Methionine: 11%
ADM liquid lysine, L-Lysine (ADM Bioproducts, Germany)
Lysine: 50%
Ph: 9.5-10.5
Blood collections were made before treatment (time zero) and at 60, 80, 120, 160, 180, 240, 300, 320, 360, 400, 420, 480, 540, 600, 660, 960, 1440 and 1800 minutes. Blood was immediately centrifuged, then plasma was collected for amino acid analysis.

In the trials using the ADM 50% liquid lysine base, the maximum lysine concentration (2.63 mg/100 ml on average) was observed at 420 minutes, as shown in Table 3. As shown in Table 4, the trials using Smartamine product did not result in a significant increase in plasma lysine level until about 4 hours after drenching, and the maximum peak did not occur until about the 16 hour mark. In the trials using the SILO product, shown in Table 5, the lysine levels were poorly affected by drenching the amino acid, with a moderate increment of the plasma amino acid up to the about the tenth hour, followed by a rapid decrease.

The methionine plasma levels had differing results as well. In the trials using the Smartamine product shown in Table 6, the increase of methionine plasma levels were markedly delayed compared to the other products Rhodimet and SILO products. In the trials using the Rhodimet 88 product, the plasma methionine levels increased rapidly after drenching, as shown in Table 7. However, the product did not plateau at high plasma levels, and it showed rapid decreases, halving its concentration at about 10 hours and reaching the baseline within 24 hours. In the trials using the SILO product shown in Table 8, the maximum concentrations were observed about 8 hours after drenching, and the levels were low and stable up to 11 hours from drenching.

EXAMPLE 3

In this example, 24 milking Holstein cows (8 primiparous and 16 multiparous) were used (Table 9). Animals were allotted to four treatment groups (6 animals each group) in aLatin square design and treated according to Table 10.

Each period of the Latin square had an adjustment period of 7 days (base diet) and a treatment period of 14 days (base diet plus amino acid supplementation for treatments T2, T3 and T4). Liquid amino acids were dosed into the drinking water (treatment T3) using individual volumetric pumps to avoid mixing of undiluted products. Tables 11-15 report the base diet and feed composition.

Blood and milk samples were collected during the adjustment and experimental periods according to Table 16. Blood samples were collected before morning meal, then centrifuged and plasma was collected for lysine and methionine determination. Milk samples were collected in two consecutive milking from all cows using a lactometer, refrigerated at 4° C. and analyzed for fat, protein and lactose content. The data was analyzed by a General Linear Model ("GLM") procedure using the values from the first adjustment period as a covariate.

Table 17 reports the average water consumption of animals being supplemented liquid amino acids within the drinking water. Tables 18 and 19 show the plasma amino acid levels for each group.

TABLE 1

Sequence of treatments (phase I)

| Date of treatment | Amino acid infusion |
|---|---|
| Day 1 - Nov. 04, 1999 | ADM liquid lysine base + Rhodimet |
| Day 2 - Jun. 12, 2000 | AT 88 |
| Day 1 - Dec. 3, 1999 | Smartamine ML + Smartamine M |
| Day 2 - Jun. 27, 2000 | |
| Day 1 - May. 15, 2000 | SILO Calcium soap rumen protected lysine and methionine |

TABLE 2

Portion used in the first series of tests

| Feed | Kg/head/day as fed |
|---|---|
| Corn silage | 6 |
| Grass hay | 8 |
| Dry cow concentrate | 2 |

TABLE 3

Plasma lysine level (mg/100 ml) after a single esophageal forced dose (60 g/head of ADM 50% liquid lysine base) in non-lactating Holstein cows

| Sampling from drenching, minutes | Day 1 | | Day 2 | |
|---|---|---|---|---|
| | Cow 1 | Cow 2 | Cow 1 | Cow 2 |
| 0 | 1.036 | 1.07 | 1.162 | 0.869 |
| 80 | 1.13 | 1.08 | — | — |
| 120 | — | — | 1.312 | 1.35 |
| 160 | 1.25 | 1.37 | — | — |
| 240 | 1.61 | 2.25 | 1.445 | 1.57 |
| 300 | — | — | 2.453 | 1.94 |
| 360 | 1.73 | 2.42 | 2.319 | 3.813 |
| 420 | 1.75 | 2.32 | 2.437 | 4.00 |
| 480 | 1.97 | 2.00 | 2.10 | 3.75 |
| 540 | 1.93 | 1.70 | 1.578 | 2.20 |
| 660 | 1.54 | 1.42 | 1.235 | 1.148 |
| 1440 | 1.44 | 1.20 | 1.038 | 0.95 |

TABLE 4

Plasma lysine level (mg/100 ml) after a single esophageal forced dose (60 g/head of lysine from Smartamine ML) in non-lactating Holstein cows

| Sampling from drenching, minutes | Day 1 | | Day 2 | |
|---|---|---|---|---|
| | Cow 1 | Cow 2 | Cow 1 | Cow 2 |
| 0 | 1.156 | 1.026 | 1.15 | 1.058 |
| 80 | 1.073 | 1.125 | — | — |
| 120 | 1.28 | 1.098 | 1.19 | 1.031 |
| 180 | 1.44 | 1.126 | 1.03 | 1.125 |
| 240 | 1.53 | 1.71 | 1.756 | 1.35 |
| 300 | 1.79 | 1.91 | 1.533 | 1.45 |
| 360 | 2.15 | 1.75 | 1.415 | 1.78 |
| 420 | 2.43 | 2.17 | 2.035 | 2.26 |
| 480 | 2.77 | 2.02 | 2.054 | 2.70 |
| 540 | 2.37 | 2.33 | 2.52 | 2.85 |
| 600 | 2.58 | 2.28 | 3.30 | 3.01 |
| 960 | 2.47 | 2.37 | 3.341 | 3.25 |
| 1800 | 1.95 | 1.70 | 2.85 | 2.276 |

TABLE 5

Plasma lysine level (mg/100 ml) after a single esophageal forced dose (60 g/head of lysine from SILO) in non-lactating Holstein cows

| Sampling from drenching, minutes | Day 1 | | Day 2 | |
|---|---|---|---|---|
| | Cow 1 | Cow 2 | Cow 1 | Cow 2 |
| 0 | 1.03 | 0.99 | — | — |
| 120 | 1.01 | 1.04 | — | — |
| 180 | 1.34 | 0.88 | — | — |
| 240 | 1.36 | 1.15 | — | — |
| 360 | 1.43 | 1.28 | — | — |
| 420 | 1.56 | 1.35 | — | — |
| 480 | 1.68 | 1.342 | — | — |
| 540 | 1.55 | 1.45 | — | — |
| 660 | 1.346 | 1.237 | — | — |
| 1440 | 1.10 | 1.05 | — | — |

TABLE 6

Plasma methionine level (mg/100 ml) after a single esophageal forced dose (50 g/head of methionine from Smartamine) in non-lactating Holstein cows

| Sampling from drenching, minutes | Day 1 Cow 1 | Day 1 Cow 2 | Day 2 Cow 1 | Day 2 Cow 2 |
|---|---|---|---|---|
| 0 | 0.39 | 0.30 | 0.37 | 0.313 |
| 60 | 0.42 | 0.37 | — | — |
| 120 | 0.39 | 0.28 | 0.33 | 0.28 |
| 180 | 0.40 | 0.33 | — | — |
| 240 | 0.37 | 0.38 | 0.425 | 0.35 |
| 300 | 0.56 | 0.57 | 0.65 | 0.50 |
| 360 | 0.95 | 0.87 | 0.75 | 0.80 |
| 400 | 1.16 | 1.10 | 1.142 | 1.12 |
| 420 | 1.25 | 1.37 | — | — |
| 480 | 1.45 | 1.57 | 1.832 | 1.36 |
| 960 | 2.87 | 4.30 | 4.00 | 2.10 |
| 1800 | 1.94 | 3.00 | 3.20 | 1.48 |

TABLE 7

Plasma methionine level (mg/100 ml) after a single esophageal forced dose (50 g/head of methionine from Rhodimet 88) in non-lactating Holstein cows

| Sampling from drenching, minutes | Day 1 Cow 1 | Day 1 Cow 2 | Day 2 Cow 1 | Day 2 Cow 2 |
|---|---|---|---|---|
| 0 | 0.26 | 0.22 | 0.345 | 0.155 |
| 80 | 0.32 | 0.30 | — | — |
| 120 | — | — | 0.476 | 0.574 |
| 160 | 0.55 | 0.61 | 0.58 | 0.60 |
| 240 | 0.70 | 0.93 | 0.69 | 0.89 |
| 300 | — | — | 0.968 | 1.57 |
| 360 | 0.95 | 1.38 | 1.45 | 1.912 |
| 420 | — | — | 1.027 | 1.685 |
| 480 | 1.25 | 1.13 | 0.997 | 1.564 |
| 540 | 0.86 | 0.70 | 0.992 | 1.341 |
| 660 | 0.75 | 0.65 | 0.78 | 1.073 |
| 1440 | 0.39 | 0.24 | 0.406 | 0.327 |

TABLE 8

Plasma methionine level (mg/100 ml) after a single esophageal forced dose (50 g/head of methionine from SILO) in non-lactating Holstein cows

| Sampling from drenching, minutes | Day 1 Cow 1 | Day 1 Cow 2 | Day 2 Cow 1 | Day 2 Cow 2 |
|---|---|---|---|---|
| 0 | 0.36 | 0.34 | 0.39 | 0.24 |
| 60 | 0.32 | 0.35 | — | — |
| 120 | 0.54 | 0.89 | 0.41 | 0.30 |
| 180 | 0.65 | 1.30 | — | — |
| 240 | 1.18 | 2.00 | 0.80 | 0.48 |
| 300 | 1.72 | 2.60 | 0.56 | 0.86 |
| 360 | 1.84 | 2.89 | 1.07 | 1.11 |
| 420 | 1.98 | 3.20 | 1.11 | 1.06 |
| 480 | 2.35 | 2.78 | 1.27 | 1.05 |
| 540 | 2.22 | 3.24 | 1.58 | 0.86 |
| 600 | 2.29 | 3.05 | — | — |
| 660 | 2.44 | 3.08 | 1.16 | 0.62 |
| 1440 | 1.05 | 0.64 | 0.49 | 0.29 |

TABLE 9

Animal used in the lactating Holstein cows experiment

| Box | Tag | Days in Milk | Milk, kg |
|---|---|---|---|
| 1 | 256 | 36 | 32 |
| 1 | 265 | 91 | 31 |
| 1 | 482 | 206 | 21 |
| 1 | 459 | 221 | 32 |
| 1 | 42 | 229 | 23 |
| 1 | 782 | 323 | 24 |
| 2 | 284 | 43 | 34 |
| 2 | 233 | 68 | 25 |
| 2 | 1 | 121 | 31 |
| 2 | 220 | 220 | 27 |
| 2 | 244 | 298 | 22 |
| 2 | 120 | 328 | 28 |
| 3 | 257 | 61 | 30 |
| 3 | 3 | 81 | 28 |
| 3 | 179 | 108 | 35 |
| 3 | 224 | 224 | 31 |
| 3 | 54 | 273 | 24 |
| 3 | 508 | 368 | 19 |
| 4 | 272 | 67 | 29 |
| 4 | 421 | 89 | 31 |
| 4 | 491 | 94 | 35 |
| 4 | 95 | 225 | 19 |
| 4 | 241 | 243 | 24 |
| 4 | 29 | 356 | 26 |

TABLE 10

Treatments

| | |
|---|---|
| T1 - Control | Base diet with no amino acid addition |
| T2 - Product mixed within the total mixed ratio | Base diet + 68 g/head/day Smartamine ML (26 g Lysine; 10.2 g Methionine) |
| T3 - Liquid product added to the drinking water | 200 g/head/day ADM liquid lysine base + 35 g/head/day Rhodimet |
| T4 - Liquid amino acids sprayed on top of the total mixed ratio | 200 g/head/day ADM liquid lysine base + 35 g/head/day Rhodimet |

TABLE 11

Diet composition (as fed)

| Feed | Kg/head/day |
|---|---|
| Corn Silage | 22 |
| Alfalfa hay dehydrate | 3.5 |
| Grass hay | 2 |
| Concentrate | 9.5 |
| Energy mix (corn meal 70%, barley meal 30%) | 1.5 |

TABLE 12

Chemical composition of the total mixed ratio (% on dry matter basis)

| Parameters | Value |
|---|---|
| Dry matter, Kg | 21.7 |
| Crude protein, % | 15.72 |
| $NE_l$, Mcal/kg | 1.63 |
| Starch and sugars, % | 26.5 |
| NDF (neutral detergent fiber) | 35.5 |
| ADF (acid detergent fiber) | 21.5 |

Forage/Concentrate ratio: 45/55

TABLE 13

Chemical composition of feeds

| Parameter | Corn silage | Alfalfa hay, dehydrate | Grass hay |
|---|---|---|---|
| Dry matter | 28 | 90 | 87 |
| Crude protein | 9.5 | 17.4 | 13 |
| Soluble protein, % CP | 55 | 40 | 35 |
| Lipids | 3.42 | 0.87 | 1.7 |
| NDF | 47.5 | 44 | 63.5 |
| ADF | 28 | 27 | 46 |
| Starch | 23.5 | — | — |
| Sugars | — | 2.5 | 1.5 |

TABLE 14

Concentrate feed composition

| Component | % on dry matter basis |
|---|---|
| Mineral and vitamin | 0.32 |
| Megalac | 2.68 |
| $CaCO_3$ | 1.13 |
| Sunflower meal, solvent extracted | 7.26 |
| Soybean meal, solvent extracted | 12.40 |
| Corn meal (10% corn flakes) | 18.03 |
| Barley meal | 16.28 |
| Potato protein concentrate | 4.06 |
| Beet pulps, dry | 11.79 |
| Molasses | 1.69 |
| Wheat bran | 12.89 |
| Corn gluten feed | 8.20 |
| $NaHCO_3$ | 0.56 |
| NaCL | 0.34 |
| $CaHPO_4$ | 1.58 |
| MgO | 0.79 |

TABLE 15

Chemical composition of concentrate

| Parameter | % on dry matter basis |
|---|---|
| Dry matter, kg | 88.74 |
| UFL | 1.05 |
| Crude protein | 21.94 |
| Crude fiber | 8.68 |
| NDF | 24.80 |
| Lipids | 5.10 |
| UIP | 8.93 |
| Soluble protein | 5.48 |
| NSC | 38.30 |
| Starch | 28.27 |
| Starch + sugar | 33.63 |
| PDIE | 14.07 |
| PDIN | 15.58 |
| P | 0.88 |
| C | 1.46 |

TABLE 16

Days of blood and milk samples collection

| Blood | Milk | Blood | Milk |
|---|---|---|---|
| 7 | 6 | 3 | 6 |
|   | 7 | 14 | 7 |
|   |   |   | 13 |
|   |   |   | 14 |

TABLE 17

Water consumption (liter/day)

| Period (by week) | (Liter/head/day) | Amino acid in drinking water |
|---|---|---|
| 1 | 78.0 | No |
| 2 | 75.0 | Yes |
| 3 | 76.0 | Yes |
| 4 | 75.0 | No |
| 5 | 78.0 | Yes |
| 6 | 65.3 | Yes |
| 7 | 64.3 | No |
| 8 | 59.0 | Yes |
| 9 | 65.8 | Yes |
| 10 | 62.7 | No |
| 11 | 65.2 | Yes |
| 12 | 60.4 | Yes |

TABLE 18

Plasma lysine concentration (mg/100 ml) at day 0, 3 and 14

| Day | T1 | T2 | T3 | T4 |
|---|---|---|---|---|
| 0 | 0.947 | 0.935 | 0.948 | 0.969 |
| 3 | 1.001 | 1.343 | 1.126 | 1.224 |
| 14 | 0.916 | 1.232 | 1.080 | 1.239 |

TABLE 19

Plasma methionine concentration (mg/100 ml) at day 0, 3 and 14

| Day | T1 | T2 | T3 | T4 |
|---|---|---|---|---|
| 0 | 0.255 | 0.272 | 0.271 | 0.259 |
| 3 | 0.323 | 0.417 | 0.302 | 0.325 |
| 14 | 0.264 | 0.376 | 0.312 | 0.352 |

TABLE 20

Production data, first week of the Latin square experimental trial

| Parameter | T1 | T2 | T3 | T4 |
|---|---|---|---|---|
| Milk, kg | 29.2 | 29.7 | 28.9 | 28.9 |
| 4% fat corrected milk, kg | 25.8 | 26.5 | 27.1 | 26.1 |
| Fat, kg | 0.93 | 0.97 | 1.05 | 0.98 |
| Protein, kg | 0.97 | 0.99 | 0.96 | 0.98 |
| Lactose, kg | 1.56 | 1.58 | 1.52 | 1.51 |
| Fat, % | 3.17 | 3.37 | 3.69 | 3.42 |
| Protein, % | 3.37 | 3.36 | 3.36 | 3.41 |
| Lactose, % | 5.32 | 5.29 | 5.24 | 5.22 |

TABLE 21

Production data, second week of the Latin square experimental trial

| Parameter | T1 | T2 | T3 | T4 |
|---|---|---|---|---|
| Milk, kg | 29.0 | 29.2 | 28.7 | 29.2 |
| 4% fat corrected milk, kg | 26.6 | 26.1 | 27.0 | 28.1 |
| Fat, kg | 0.99 | 0.96 | 1.04 | 1.10 |
| Protein, kg | 0.97 | 0.97 | 0.94 | 1.02 |
| Lactose, kg | 1.54 | 1.55 | 1.49 | 1.54 |
| Fat, % | 3.43 | 3.51 | 3.85 | 3.84 |
| Protein, % | 3.38 | 3.40 | 3.37 | 3.50 |
| Lactose, % | 5.29 | 5.30 | 5.16 | 5.24 |

What is claimed is:

1. A ruminant animal feed, comprising:
ruminant animal feed; and
an unprotected liquid lysine base feed supplement having a concentration between about 45% and about 55%, and having a pH level of between about 9.5 and about 10.5, and having a chloride content below about 0.25%,
wherein the liquid lysine base feed supplement is present in an amount sufficient to increase plasma lysine levels in ruminant animals to a level equal to or greater than if an equivalent amount of amino acids were provided to the ruminant animal in a protected form.

2. The ruminant animal feed of claim 1, wherein said lysine has chloride content between about 0.10% and about 0.15%.

3. The ruminant animal feed of claim 1, wherein said lysine has a bulk density between about 1.14 g/cm$^3$ and about 1.17 g/cm$^3$.

4. The ruminant animal feed of claim 3, wherein said lysine has a bulk density of about 1.17 g/cm$^3$.

5. The ruminant animal feed of claim 3, wherein said lysine has a maximum moisture level of between about 42% and about 48%.

6. The ruminant animal feed of claim 5, wherein said lysine has a maximum moisture level of about 45%.

7. The ruminant animal feed of claim 5, wherein said lysine has a pH level of between about 9.8 and about 10.2.

8. The ruminant animal feed of claim 7, wherein said lysine has a pH level of about 10.

9. The ruminant animal feed of claim 1, wherein said ruminant animal feed is dry fodder.

10. The ruminant animal feed of claim 1, wherein said ruminant animal feed is a liquid.

11. The ruminant animal feed of claim 10, wherein said liquid is selected from the group consisting of drinking water, milk replacers and liquid feed.

12. The ruminant animal feed of claim 1, wherein said ruminant animal feed includes dry fodder and a liquid.

13. The ruminant animal feed of claim 12, wherein said liquid is selected from the group consisting of drinking water, milk replacers and liquid feed.

14. The ruminant animal feed of claim 1, wherein said lysine has a concentration of about 50%.

15. A ruminant animal feed, comprising:
ruminant animal feed, and
an unprotected liquid lysine base feed supplement having a concentration between about 45% and about 55%, and having a pH level between about 9.5 and about 10.5, a chloride content between about 0.10% and about 0.15%, a bulk density between about 1.14 and about 1.17 g/cm$^3$, and a maximum moisture level between about 42% and about 48%,
wherein the liquid lysine base feed supplement is present in an amount sufficient to increase plasma lysine levels in ruminant animals to a level equal to or greater than if an equivalent amount of amino acids were provided to the ruminant animal in a protected form.

16. The ruminant animal feed of claim 15, wherein said ruminant animal feed is dry fodder.

17. The ruminant animal feed of claim 15, wherein said ruminant animal feed is a liquid.

18. The ruminant animal feed of claim 17, wherein said liquid is selected from the group consisting of drinking water, milk replacers and liquid feed.

19. The ruminant animal feed of claim 15, wherein said ruminant animal feed includes dry fodder and a liquid.

20. The ruminant animal feed of claim 19, wherein said liquid is selected from the group consisting of drinking water, milk replacers and liquid feed.

21. A method of increasing the plasma amino acid level of ruminant animals, comprising the following steps:
providing ruminant animal feed; and
supplementing said ruminant animal feed with an amino acid supplement comprising an unprotected liquid lysine base feed supplement having a concentration of between about 45% and about 55%, and having a pH level of between about 9.5 and about 10.5, and having a chloride content below about 0.25%,
wherein the liquid lysine base feed supplement is present in an amount sufficient to increase plasma lysine levels in ruminant animals to a level equal to or greater than if an equivalent amount of amino acids were provided to the ruminant animal in a protected form.

22. The method of claim 21, wherein said lysine has a concentration of about 50%.

23. The method of claim 21, wherein said lysine has a chloride content between about 0.10% and about 0.15%.

24. The method of claim 21, wherein said lysine has a bulk density between about 1.14 and about 1.17 g/cm$^3$.

25. The method of claim 24, wherein said lysine has a bulk density of about 1.17 g/cm$^3$.

26. The method of claim 24, wherein said lysine has a maximum moisture level between about 42% and about 48%.

27. The method of claim 26, wherein said lysine has a maximum moisture level of about 45%.

28. The method of claim 21, wherein said lysine has a pH level between about 9.8 and about 10.2.

29. The method of claim 28, wherein said lysine has a pH level of about 10.

30. The method of claim 21, wherein said ruminant animal feed is dry fodder.

31. The method of claim 21, wherein said ruminant animal feed is a liquid.

32. The method of claim 31, wherein said liquid is selected from the group consisting of drinking water, milk replacers and liquid feed.

33. The method of claim 21, wherein said ruminant animal feed includes dry fodder and a liquid.

34. The method of claim 33, wherein said liquid is selected from the group consisting of drinking water, milk replacers and liquid feed.

* * * * *